(12) United States Patent
Dodd

(10) Patent No.: US 8,737,798 B2
(45) Date of Patent: May 27, 2014

(54) RECORDING APPARATUS

(75) Inventor: Kevin Dodd, Basingstoke (GB)

(73) Assignee: Sony Corporation, Tokyo (JP)

(*) Notice: Subject to any disclaimer, the term of this patent is extended or adjusted under 35 U.S.C. 154(b) by 1063 days.

(21) Appl. No.: 12/415,378

(22) Filed: Mar. 31, 2009

(65) Prior Publication Data

US 2009/0245750 A1   Oct. 1, 2009

(30) Foreign Application Priority Data

Mar. 31, 2008 (GB) .................................. 0805816.6

(51) Int. Cl.
*H04N 5/765* (2006.01)

(52) U.S. Cl.
USPC ........................................................ 386/200

(58) Field of Classification Search
USPC ............................................. 386/68, 83, 200
See application file for complete search history.

(56) References Cited

U.S. PATENT DOCUMENTS

| | | | | |
|---|---|---|---|---|
| 5,973,733 | A * | 10/1999 | Gove .................. | 348/208.13 |
| 2001/0041047 | A1* | 11/2001 | Kawajiri .................. | 386/46 |
| 2002/0028003 | A1* | 3/2002 | Krebs et al. .................. | 382/115 |
| 2005/0031156 | A1* | 2/2005 | Rhoads .................. | 382/100 |
| 2007/0031111 | A1* | 2/2007 | Thiagarajan et al. .......... | 386/83 |
| 2008/0285936 | A1* | 11/2008 | Yampanis et al. .............. | 386/46 |
| 2009/0245750 | A1* | 10/2009 | Dodd .............................. | 386/68 |

FOREIGN PATENT DOCUMENTS

| | | |
|---|---|---|
| JP | 2006-65904 | 3/2006 |
| WO | WO 03/079679 | 9/2003 |

OTHER PUBLICATIONS

Zongming Fei, Providing Interactive Functions for Staggered Multicast Near Video-On-Demand Systems, 1999, IEEE, pp. 949-953.*

Arun Hampapur, et al.; Comparison of Sequence Matching Techniques for Video Copy Detection, IBM T.J Watson Research Center, Hawthorne, NY and School of Computer and Information Eng, YoungSan University, Kyongman, Korea, in SPIE, Editor, Storage and Retrieval for Media Databases, vol. 4676, pp. 194-201, (2001).

Nicole S. Love, et al.; An Empirical Study of Block Matching Techniques for the Detection of Moving Objects. Center for Applied Scientific Computing, LLNL Technical Report UCRL-TR-218038, Livermore, CA, pp. 1-36, (2006).

* cited by examiner

*Primary Examiner* — Hadi Armouche
*Assistant Examiner* — Dao Ho
(74) *Attorney, Agent, or Firm* — Oblon, Spivak, McClelland, Maier & Neustadt, L.L.P.

(57) ABSTRACT

A recording apparatus that has a control unit, a storage unit and a recording unit. The recording unit is configured to record television signals representing programs onto storage device. If a partially recorded program is stored on storage unit, the apparatus is configured to subsequently record and store a full recording of that program. The control unit is configured to insert markers into the full version of the program to indicate the position or positions of the delayed start and/or premature end of the partial recording. The partial recording can thus be deleted from storage unit, but the user of the recording apparatus can still identify the delayed start point and/or premature end point of the partial recording from the full recording.

27 Claims, 4 Drawing Sheets

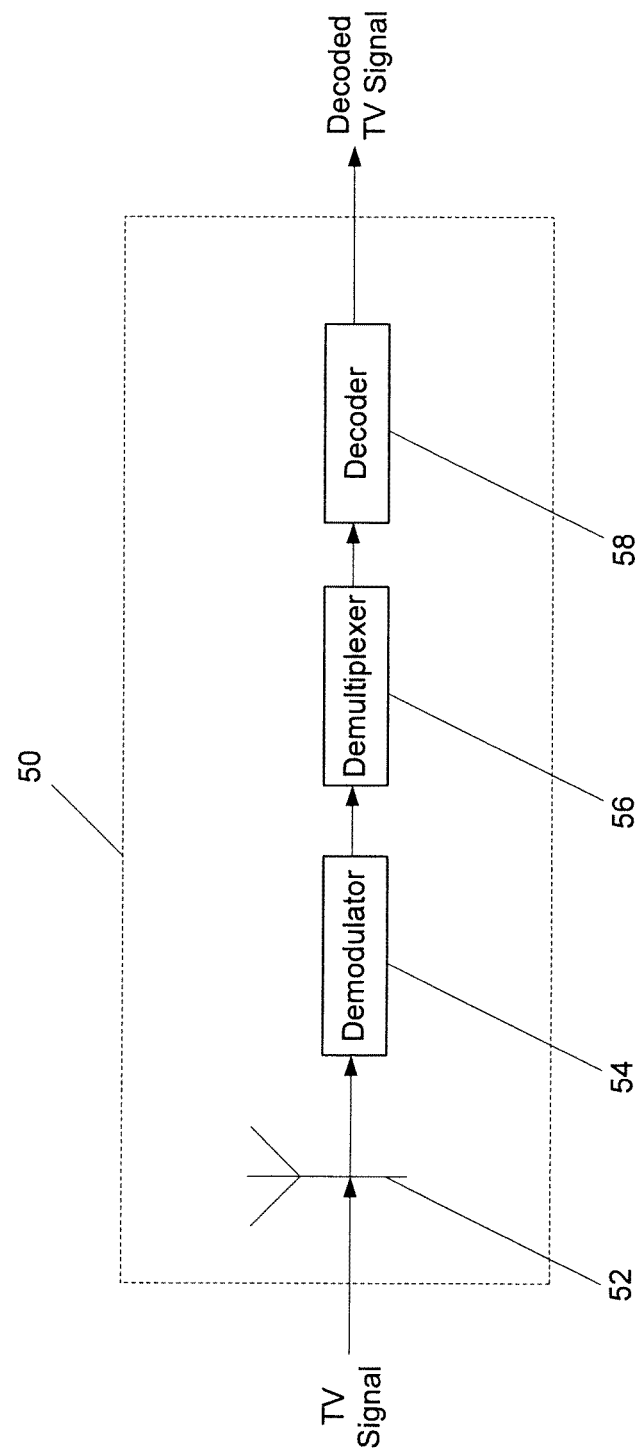

RECORDING APPARATUS

CROSS REFERENCE TO RELATED APPLICATIONS

This patent specification is based on United Kingdom Patent Application No. GB0805816.6 filed on Mar. 31, 2008 in the United Kingdom Intellectual Property Office, the entire contents of which are incorporated by reference herein.

BACKGROUND OF THE INVENTION

1. Field of the Invention

The present invention relates to the storage of recorded television signals representing programs, and in particular to the management of stored television signals representing programs.

2. Description of the Related Art

If a recording of a program is only partially complete, then it is often desirable to record a repeated version of that program so as to have the full version recorded. Some presently available recording devices are capable of automatically recording a repeated version of a program which has previously been partially recorded. In such a presently available apparatus, once recording of the repeated, full version of the program has been completed, both the original partial recording and the repeated full recording of the program are stored. This has several disadvantages associated with it. For example, enough storage space is required to store both the partial recording and the full recording. By way of further example, the user of such a recording device would be presented with two versions of the program for watching, which is potentially confusing and it could be difficult to determine which of the two versions to watch back.

It may be possible for the user of such a recording device to manually delete one of the recordings in order to save storage space and reduce subsequent confusion as to which version represents which recording. For example, the partial recording could be deleted. However, this is undesirable because it can be useful to be able to watch both the full recording and the partial recording. For example, one user of such a recording apparatus may have missed the entire broadcasting of the program, and therefore wish to view the full recording, whereas another user of the recording device may have seen the first part of the program, and then initiated recording, such that they only wish to view the partial recording. If either of the two recordings were deleted, then viewing of both the full version and the partial version would be extremely difficult. For example, if the partial version were deleted, then a user wishing to view only the partial version would then be required to scan through the full version manually to the point at which the partial version started.

SUMMARY OF THE INVENTION

According to one aspect of the present invention, there is provided a broadcast signal storage apparatus comprising:

a storage unit capable of storing recordings of broadcast signals representing programs; and a control unit for controlling said broadcast signal storage apparatus, the control unit being arranged, responsive to storage on said storage unit of both a first recording of a broadcast signal representing a partial version of a program, the partial version having a delayed start point and/or premature end point, and a second recording of a broadcast signal representing a full version of the same program, to:

determine the position or positions in said second recording that correspond to the delayed start point and/or premature end point of said first recording; and store one or more markers indicating said position or positions in said second recording.

The present invention allows both the full version and the partial version of the recorded program to be readily accessed from the full version of the recorded program.

The partially recorded program may have either a delayed start point (for example if recording of the program were started after the beginning of the broadcasting of the program), or a premature end point (if recording of the program were stopped before the finish of the program). The control unit acts to insert markers into the second, complete recording to indicate the corresponding positions of the delayed start and/or premature end of the partially recorded version of the program. In this way, the markers can enable a user of the broadcast signal storage apparatus to determine, in the full recording, the positions corresponding to the delayed start and/or premature end of the partial recording using the markers inserted into the full recording. This, in turn, enables a part of the full recording that corresponds to the partial recording to be readily identified and accessed.

The source of the recording representing the partial version of the program and/or the recording representing the full version of the program could be a cable, a satellite or a terrestrial broadcast, or a scheduled content streamed live over an internet protocol based network (IPTV). The source of the recording representing the partial version of the program and the recording representing the full version of the program could be the same, or different.

A variety of different techniques could be used to determine the position or positions in the full recording that correspond to the delayed start and/or premature end of the first recording.

One possible technique involves frame matching.

For example, the first frame of a partial recording with a delayed start could be matched to a corresponding frame in the full recording. Similarly, the last frame of a partial recording with a premature end could be matched to a corresponding frame in the full recording. Matching a single first and/or single last frame of the partial recording to corresponding frames of the full recording is a frame matching technique that requires only limited processing power to perform.

Alternatively, a plurality of frames from the start of a partial recording with a delayed start could be matched to a corresponding plurality of frames in the full recording. Similarly, a plurality of frames from the end of a partial recording with a premature end could be matched to corresponding frames in the full recording. Using a plurality of frames at the start/end of the partial recording in order to determine the equivalent position or positions in the full recording could increase the chances of finding a frame match in the full recording and/or increase the accuracy of the match.

Various frame matching techniques could be used in determining the position or positions in the full recording that correspond to the delayed start and/or premature end of the partial recording, as described herein. For example, the frame matching technique could involve the use of: digital Fourier transforms; hash algorithms; Hough transforms; and/or a Kalman Filter.

Use of a hash algorithm in the frame matching is relatively straightforward and could be performed relatively quickly. Use of a digital Fourier transform is also simple and quick to perform. It is also robust enough to correctly identify frame matches between two frames in which the data bits representing the frames are not exactly the same as each other, even though the two frames are intended to be the same. As such, use of a digital Fourier transform in the frame matching technique is robust and efficient. Using Hough transforms can be advantageous because they are robust in noisy environments.

The frame matching technique may additionally or alternatively involve using characteristic features of the frame or frames being matched. Such a characteristic feature may involve, for example, matching a list of the co-ordinates of the centres of areas of uniform colour which are above a minimum threshold size in the frame or frames of the partial recording to be matched with a corresponding list in a frame or frames of the full recording.

An advantage of using characteristic features of the frame or frames to be matched is that the frame matching technique can be based directly on the features of the frames. As such, there is no requirement to perform processing on the data bits representing the frame or frames. A further advantage is that the frame matching can readily be based on matches that are within a particular threshold, thereby allowing matches to be declared even if two frames are not absolutely identical (caused by, for example, a different degree of compression being used in the partial recording to that used in the full recording).

Any other suitable technique can be used to determine the position or positions in the full recording that correspond to the delayed start and/or premature end in the partial recording.

For example, audio-matching techniques can additionally or alternatively be used to determine the position or positions in the full recording that correspond to the delayed start and/or the premature end of the partial recording. This has the advantage that no processing of the video data at the delayed start and/or the premature end of the partial recording is required.

By way of further example, meta-data can be used to determine the position or positions in the full recording which correspond to the delayed start and/or premature end of the partial recording. Such meta-data can be extracted from the transport streams of broadcast digital signals associated with the digital signals representing the partially recorded program and the full recorded program.

Information from meta-data in the DVB standard provided in the Event Information Table and/or the Time Offset Table and/or the Time and Date Table could be used to determine the required position or positions in the full recording. An advantage of using meta-data to determine the position or positions in the full recording that correspond to the delayed start and/or the premature end of the partial recording is that this data can be extracted directly from the transport stream. As such, no processing is required to be performed on the program content (such as the video and/or audio content) of the program itself. Thus, the processing required to locate the position or positions in the full recording can be straightforward and efficient.

Any of the methods discussed herein for determining the position or positions in the full recording that correspond to the delayed start and/or premature end of the partial recording can be either threshold-based or best-match based. Threshold-based techniques enable a match to be found efficiently, without the need to search through the whole of the complete recording. Best-match techniques can be very accurate, because they enable the closest match in the whole of the complete recording to be located.

The control unit of the broadcast signal storage apparatus can be further arranged to identify a second broadcasting of the partially recorded program before the signal representing the full program has been broadcast. The second broadcast representing the complete program can then be automatically recorded by an associated recording unit (which may or may not be a part of the broadcast signal storage apparatus) when it has been identified. This removes the need for the user to identify a second broadcasting of a partially recorded program and the need to instruct the recording of that second version. Content Reference Identifiers (CRIDs) can be used to identify the second, repeated version of the partially recorded program. For example, the control unit could simply match the CRID of the partially recorded program with a CRID of a program to be subsequently broadcast.

The control unit of the broadcast signal storage apparatus can be further arranged to delete the partial recording. Deleting the partial recording reduces the storage capacity required.

The partial recording can be deleted after the full version of the program has been recorded and the markers have been put into the full recording.

Alternatively, the information required to determine the position or positions in the full version that correspond to the delayed start and/or the premature end in the partial recording can be extracted from the partial recording. This can be performed before the signal representing the complete, repeated program is broadcast. This enables the partial recording to be deleted anytime after the required information has been extracted, which could be before the signal representing the repeated, complete version of the program has been broadcast. This enables earlier deletion of the partial recording, thereby further reducing the storage capacity required.

The broadcast signal storage apparatus could further comprise a timer which could be started and/or stopped at the start (which could be delayed or normal) and/or end (which could be premature or normal) of the partial recording. This timer could then be used to give an approximation of the position or positions of the complete recording that correspond to the delayed start and/or the premature end of the partial recording. This approximation could be used, for example, to determine the approximate time of the equivalent position or positions in the second recording. In turn, this approximate time could be used to reduce the range in the full recording that is searched for a match. For example, it could be used to reduce the number of frames in the full recording that are searched. As such, the timer could improve the efficiency of determining the position or positions in the full recording that correspond to the delayed start and/or the premature end of the partial recording.

The control unit can be further arranged to recognise that the first recording represents a partially recorded version of a program and instruct the second recording of the full version of the program on the basis of that recognition. According to this aspect of the invention, if a program is partially recorded and stored, then the control unit can automatically instruct the recording of a second, complete version of the partially recorded program.

According to another aspect of the present invention, there is provided a graphical user interface for use with a broadcast signal storage apparatus, the broadcast signal storage apparatus having stored thereon:

a recording of a broadcast signal representing a full version of a program; and one or more markers indicating the position or positions in said recording that correspond to a delayed start point and/or premature end point of a previously recorded broadcast signal representing a partial version of the same program, wherein, the graphical user interface is arranged to allow playback of said recording of the broadcast signal representing the full version of the program to be selected to start from at least one of: (i) the beginning of said recording; and (ii) the position or positions indicated by said one or more markers.

A graphical user interface that allows a selection to be made to instruct the recording of the full version of the program to be played back either from the beginning of the full recording or the position(s) indicated be the marker(s) that represent the delayed start and/or premature end of the partial recording may also be provided in combination with any of the broadcast digital storage apparatus discussed herein.

Such a graphical user interface would enable a user to select easily the point from which to watch the full recording from either the start, or the marked position(s). This could be useful if, for example, one user wanted to watch the whole program, whereas another user wanted to watch only from a marked position.

According to another aspect of the present invention there is provided a method of operating a broadcast signal storage apparatus capable of managing recordings comprising:

determining a position or positions in a second recording that is a full version of a program that correspond to a delayed start point and/or a premature end point in a first recording that is a partial version of the same program; and marking said position or positions in said second recording.

According to further aspects of the present invention, there are provided methods corresponding to the operation of the apparatuses described herein. There may also be provided corresponding computer programs. These computer programs may be stored on a computer-readable storage medium, and/or represented by carrier waves.

BRIEF DESCRIPTION OF THE DRAWINGS

FIG. 4 is a detailed diagram of a receiver-decoder for use with the present invention.

DETAILED DESCRIPTION OF THE PREFERRED EMBODIMENTS

The invention will more clearly be understood from the following description, given by way of example only, with reference to the accompanying drawings.

Figure 1A:
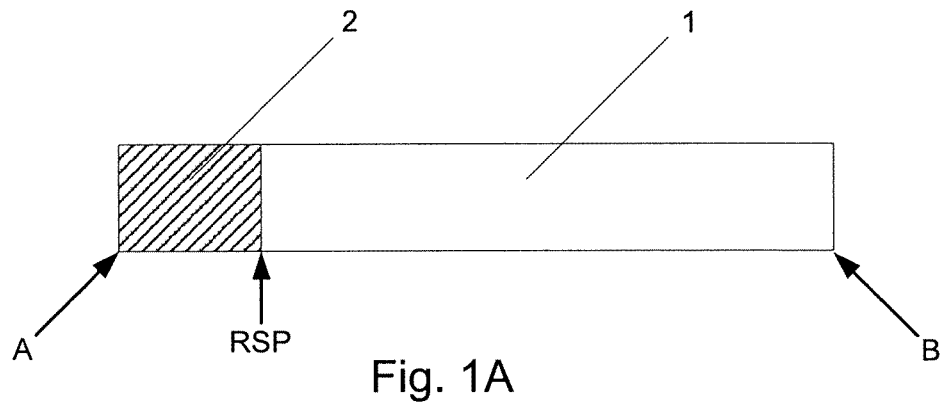
FIGS. 1A-1C are diagrams showing a portion or portions of programs that may have been missed in a partial recording.
Figure 1B:
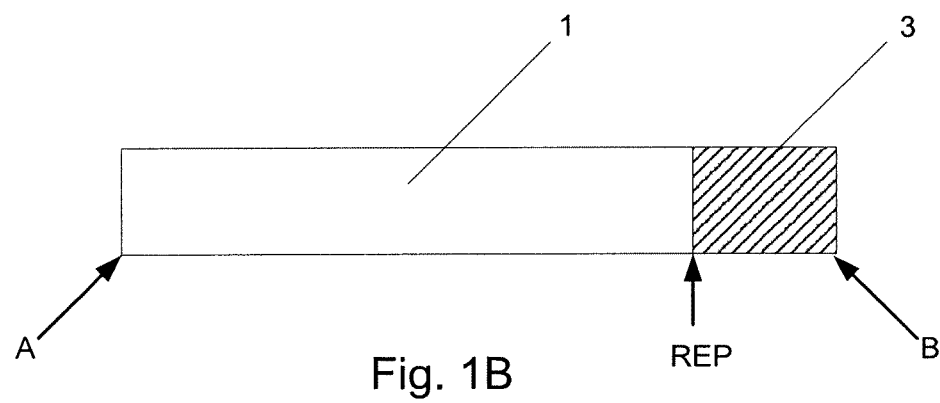
Figure 1C:
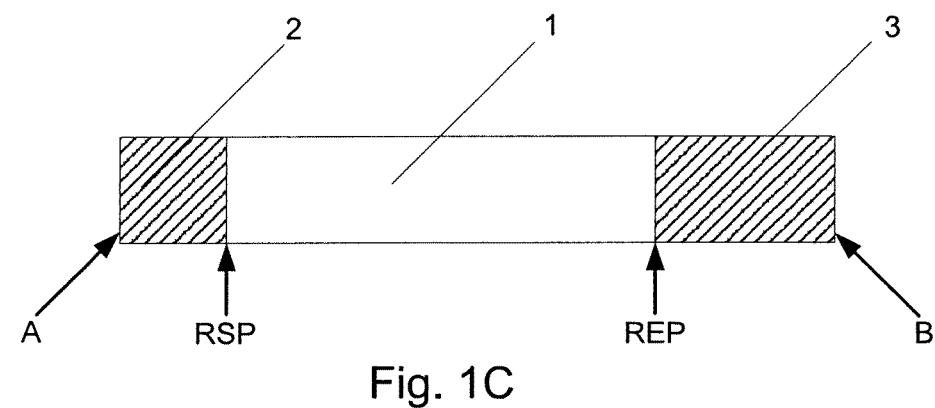

FIGS. 1A-1C illustrate typical portions of a program that may be missed during a partial recording of that program.

FIG. 1A illustrates a recording that is begun after the start of a broadcast of the program i.e. the recording has a delayed start point. In FIG. 1A, point A represents the start of the broadcast of the program, and point B represents the end of the broadcast of the program. The point at which the recording of the program is started is indicated by RSP—the Record Start Point. Thus, the shaded portion 2 represents the part of the program that has not been recorded, and the unshaded area 1 indicates the portion of the program that has been recorded.

Such a partial recording as shown in FIG. 1A could occur for a number of reasons. For example, the user of the broadcast signal recording apparatus (which may be referred to herein as a recording apparatus) may have watched the program from the start and only realised at point RSP that he/she would like to record the program. Alternatively, a user of the recording apparatus may have started watching the program on an output device (such as a television) associated with the recording apparatus from the start (i.e. at point A) and then have had to leave the output device at point RSP. The user may then wish to record the program that they were watching from point RSP for viewing at a later date.

FIG. 1B illustrates a partial recording in which the first part of a broadcast program (between point A and point REP (the Record End Point)) has been recorded, but the end of the program (between point REP and point B) has not been recorded. The recorded area 1 is shown unshaded, and the unrecorded area 3 is shown as shaded. Again, there can be several reasons for such a partial recording. For example, two overlapping programs may have been selected to be recorded by a recording apparatus that is only capable of recording one program at a time. Alternatively, the broadcast of the program that is being recorded may have been delayed for some reason. Alternatively still, the recording could have been accidentally stopped, for example by a user or because of a power cut. Alternatively still, the recording could have been prematurely stopped because of the recording media/storage device onto which it was being recorded being full.

FIG. 1C illustrates the situation where both the start and the end of a program have not been recorded. In this case, the two shaded areas 2, 3 illustrate the non-recorded portions of the program, and the unshaded area 1 illustrates the recorded portion of the program.

Figure 2:
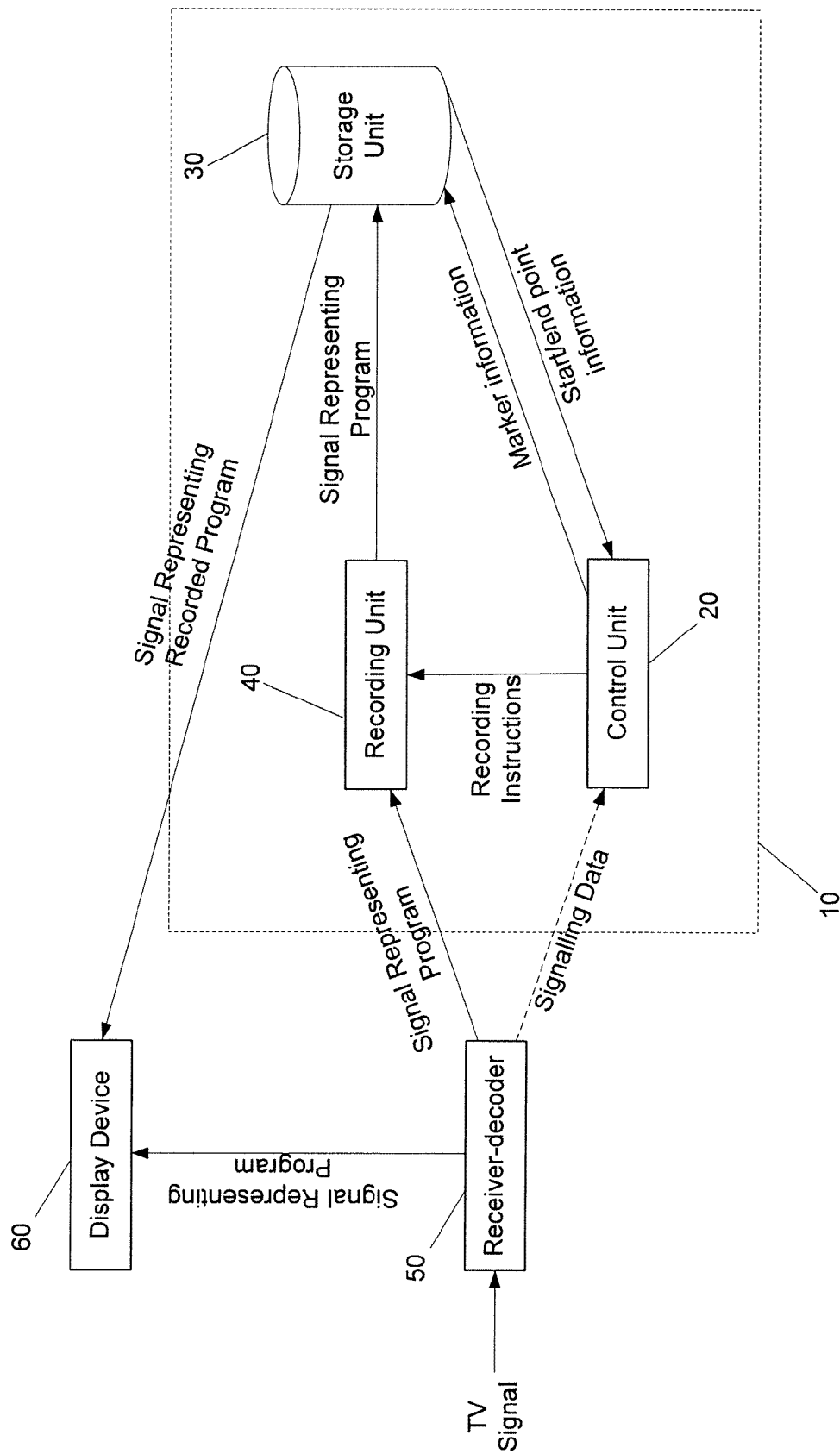
FIG. 2 is a diagram of a broadcast signal storage apparatus according to an embodiment of the present invention.

FIG. 2 illustrates a recording apparatus 10 which is an embodiment of the present invention. The recording apparatus 10 comprises a control unit 20, a storage unit 30, and a recording unit 40.

In the embodiment of FIG. 2, broadcast signals representing programs are input to recording unit 40 from outside the recording apparatus 10. For example, such a signal could have come from a receiver-decoder 50 which had received as input a television signal which had been received by an antennae/tuner apparatus. It is envisaged that the present invention would most appropriately be used with digital broadcast signals. However, the present invention may also be applied to analog broadcast signals.

The control unit 20 can be a microprocessor. The invention may be implemented by running a program using the microprocessor. The program to be run by the microprocessor could be provided as a software upgrade. The software upgrade may be stored on a computer-readable storage medium such as a memory or transmitted over a network during which transmission it is represented by a carrier wave.

The storage unit 30 can be arranged to supply recorded signals to a display device 60. The display device 60 may also receive television signals directly from the receiver decoder 50.

Alternatively or additionally, the receiver-decoder 50, display device 60, and/or any other apparatus required to receive, decode, and/or display broadcast television signals may be integrated into the recording apparatus 10.

The recording unit 40 may be of any type and may be capable of recording on any type of storage medium. The storage unit 30 may be any type of storage medium, typically a hard disc drive. In some embodiments, the recording unit 40 and the storage unit 30 may be integrated. In other embodiments, the recording unit 40 and the storage unit 30 may be separate and replaceable. Typically, the recording unit 40 would act to direct a signal representing a program onto the storage unit 50. As such, the recording unit 40 could be a simple switch.

The receiver-decoder 50 is arranged to receive and decode the supplied television signal. The construction of the receiver-decoder 50 depends on the nature of the received television signal. FIG. 4 shows the details of a typical receiver-decoder 50 for use with a radio frequency (RF) broadcast television signal (which may be either digital or analog). In this case, the receiver-decoder 50 comprises an RF tuner 52 to extract the desired transmission channel of the broadcast signal, a demodulator 54 to demodulate the broadcast signal and extract a multiplexed signal, a demultiplexer 56 to extract a particular television signal, and a decoder 58 to decode the television signal. In the embodiment shown in FIG. 2, the signal representing the program that is passed from receiver-decoder 50 to recording unit 40 is a decoded television signal.

In the embodiment illustrated in FIG. 2, the receiver-decoder 50 is shown as being outside of the recording apparatus 10. In alternative embodiments, the receiver-decoder 50 may be incorporated into the recording apparatus 10.

In the embodiment shown in FIG. 2, the control unit 20 is arranged to provide recording instructions to recording unit 40. This could be, for example, a simple instruction to direct the incoming, decoded signal onto the storage unit 50. The control unit 20 is further arranged to receive information from storage unit 30 regarding a delayed start and/or premature end of a partially recorded program stored on storage unit 30. The control unit 20 is further arranged to determine the position or portions in a full recording of a program that correspond to a delayed start and/or premature end of a partial recording of that same program. The control unit 20 is still further arranged to insert markers into the full recording of the program which correspond to the determined positions equivalent to the delayed start and/or premature end of the partial recording.

The procedure that the recording apparatus 10, and in particular the control unit 20 of the recording apparatus 10, is arranged to perform is described below in relation to the flow chart shown in FIG. 3.

Figure 3:
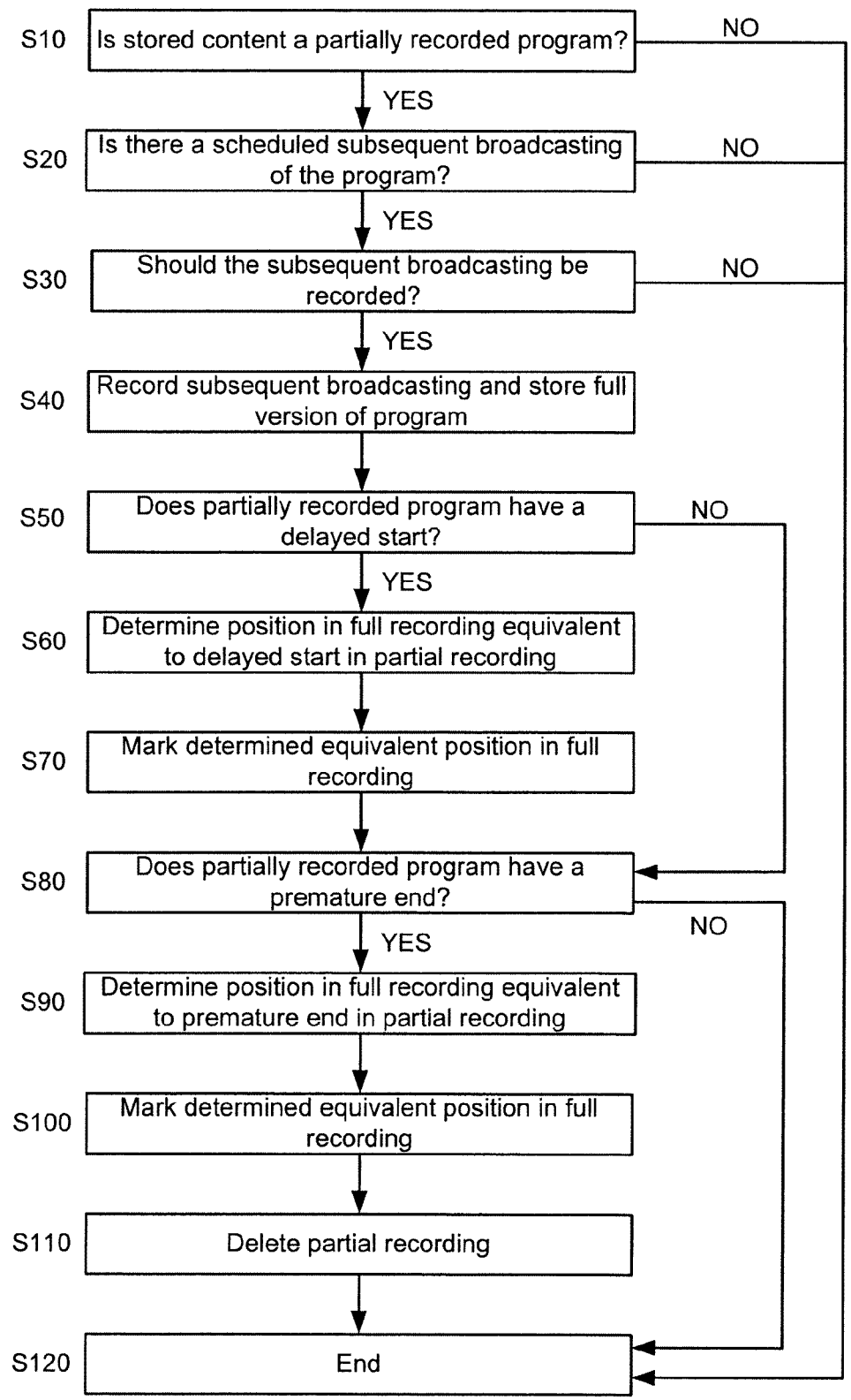
FIG. 3 is a flow chart of the process of inserting markers into a full recording performed by the broadcast signal storage apparatus of FIG. 2.

In step S10 of FIG. 3, it is determined whether a particular piece of content stored on storage unit 30 is a signal representing a partially recorded program. This can be determined by an input to the recording apparatus 10 from a user of the recording apparatus 10, for example using a remote control device.

Alternatively or additionally, whether or not a particular piece of content is a signal representing a partially recorded program (also referred to herein as a "partial recording") can be determined by control unit 20 from the stored content itself. For example, the stored content could have meta-data corresponding to the recorded (or partially recorded) program also stored. This meta-data could be used on its own, or in conjunction with a recording time of the stored content, in order to determine whether or not the stored content is a partially recorded program. For example, meta-data provided in the Event Information Table includes information about the duration of the program which can be used to determine whether the recorded version of the program is a partial recording. Meta-data from the Event Information Table could also be used to determine the start and/or end time of the broadcast program. Meta-data from the Time Offset Table and/or the Time and Date Table could then be used to determine the actual time at which the recording is started and/or finished. This data about the broadcast start/end times and actual recording start/end times could be also be used to determine if the content is a partial recording.

The control unit 20 could search for content on the storage unit 30 representing partially recorded programs automatically (for example at predetermined intervals, such as once per day) or upon request (for example upon request for a user of the recording apparatus 10 which could be, for example, by a user pressing a button on a remote control associated with the recording apparatus 10).

If it is determined in step S10 that a particular piece of stored content is a partial recording, then the process moves to Step S20. In step S20, it is determined whether or not there is a scheduled subsequent broadcasting of the program for which a partial recording has been determined as being stored on storage unit 30 in step S10. This could be determined by manual user input into recording apparatus 10 by a user of recording apparatus 10. For example, the user of the recording apparatus 10 could manually search through subsequent listings (for example on an electronic program guide) to determine if a subsequent broadcasting is scheduled. Alternatively or additionally, the control unit 20 could determine whether a subsequent version of the partially recorded program is scheduled to be broadcast.

For example, the control unit 20 could automatically search an electronic program guide (or the meta-data used to assemble an electronic program guide) in order to identify a subsequent broadcasting of the partially recorded program. Typically, the control unit 20 would search for a content reference identifier (CRID) of a schedule program that matched the content reference identifier of the partially recorded program. A scheduled program with the same CRID as the partially recorded program would be identified by control unit 20 as being a subsequent broadcast (or repeat) of that program.

If it is determined in step S20 that a subsequent broadcasting of the partially recorded program is scheduled, then the process moves to step S30. According to the embodiment illustrated in FIG. 3, if it is determined in step S20 that there is no scheduled subsequent broadcasting of the partially recorded program, then the process is terminated. In alternative embodiments, the control unit 20 may be arranged so as to search for any scheduled broadcasting of a partially recorded program at predetermined intervals. For example, if no scheduled subsequent broadcasting of a partially recorded program is identified, then control unit 20 could search for such a subsequent broadcasting on a daily basis until a scheduled subsequent broadcasting is identified.

In step S30 it is determined whether or not the scheduled subsequent broadcasting of the partially recorded program should be recorded. This could be determined by default. For example, a user of the recording apparatus 10 could indicate that if a subsequent broadcasting of a partially recorded program is identified as being scheduled in step S20, then it should automatically be recorded. Alternatively, the recording apparatus 10 could be configured such that, if a subsequent broadcasting is identified as being scheduled in step S20, then a user input is required to determine whether the subsequent broadcasting should be recorded. The user input could be, for example, through a remote control apparatus associated with the recording apparatus 10.

If it is determined in step S30 that the subsequent broadcasting of the partially recorded program should be recorded, then the process moves to step S40. If it is determined that the scheduled broadcasting should not be recorded, then the process is terminated.

In step S40, the subsequent broadcasting is recorded by recording unit 40, and the full version of the program is stored on storage unit 30. According to the present embodiment, the control unit 20 instructs the recording unit 40 to record the full version of the program in step S40.

In step S50, it is determined whether the partial recording has a delayed start. In other words, it is determined in step S50 whether the partial recording corresponds to that shown in FIG. 1A or 1C. In the illustrated embodiment, the determination of whether or not the partial recording has a delayed start is performed by control unit 20 of recording apparatus 10. Alternatively or additionally, the determination could be through manual input from a user of the recording apparatus 10. This could be, for example, through a user inputting instructions from a remote control device associated with the recording apparatus 10.

Any suitable method could be used by control unit 20 to determine if the partially recorded program has a delayed start point. For example, meta-data from the Event Information Table could be used to determine the start time of the program itself. Meta-data from the Time Offset Table and/or the Time and Date Table could be used to determine the actual time at which the recording is started. If the start time of the program as extracted from the Event Information Table is before the actual start time of the recording as determined from the Time Offset Table and/or the Time and Date Table, then control unit 20 determines that the partially recorded program has a delayed start. In some embodiments, the results of the steps performed in step S10 could be used in step S50.

In some embodiments, the control unit 20 could determine that the partially recorded program has a delayed start if the start time of the program is more than a predetermined time before the actual start of the recording of that program. This set time could be, for example, one second, five seconds, ten seconds, one minute, or five minutes.

If it is determined in step S50 that the partially recorded program has a delayed start then the process moves to step S60. If it is determined in step S50 that the partially recorded program does not have a delayed start, then the process moves to step S80, discussed below.

In step S60, the control unit 20 determines the position in the full recording of the program that was recorded in step S40 that corresponds to the delayed start point of the partial recording of the program. Any suitable technique or method could be employed by control unit 20 to determine the position in the full recording corresponding to the delayed start in the partial recording. Examples of such methods and techniques are discussed below.

One technique that could be used by control unit 20 in step S60 involves frame matching. In this example, the first frame of the partial recording that has been identified as having a delayed start point is matched, using any one of a number of different techniques, to a frame in the full version of the program that was recorded and stored in step S40. Instead of matching the first frame of the partial version to an equivalent frame in the full version, the first few frames of the partial recording could be matched. For example, the first two, five, ten, 50 or 100 frames could be matched. Still alternatively, rather than the very first frame being matched, any one of the first few frames could be matched. For example, any one (or more) of the first two, five, ten, 50 or 100 frames could be matched.

One technique that could be used by control unit 20 to determine matching frames is that of using digital Fourier transforms (DFT). According to this technique, a digital Fourier transform is performed on the data (or pixels) of the frame or frames of the partial recording to be matched. This produces a frequency response for the frame or frames to be matched. A digital Fourier transform could then be performed by control unit 20 on the frames of the full recording. The control unit 20 could then compare the frequency response of the frame or frames in the partial recording to be matched with the frequency response of the frames of the full recording unit 40 until a match is found. High frequency data, such as noise, can be filtered out. In this way, taking a digital Fourier transform of the frame or frames could be used to determine the frame or frames in the full recording that corresponds to the frame or frames at the delayed start of the partial recording.

In other embodiments, alternative processing could be performed on the frame or frames being matched. For example, the frame or frames being matched could be subjected to a hash algorithm or a Hough transform.

For example, a hash algorithm could have as input (i.e. operate on) the bits of the frame or frames of the partial recording to be matched. The output of the hash algorithm would be a different fixed length string of bits, which would act as a fingerprint (or signature) for the frame or frames to be matched. This fingerprint could then be compared with the output of the same hash algorithm operating on frames of the full recording. Because the hash algorithm is repeatable, once the fingerprint for the frame or frames in the partial recording were matched to an output of the hash algorithm in the full recording, then a frame match could be declared.

However, the change of a single bit in the input to a hash algorithm would lead to the generation of an entirely different fixed length string. Thus, in order to ensure that correct matches were found even if there were slight differences in the bits of the frames that should be declared as matching, it may be advantageous to operate the hash algorithm on a (measured) characteristic feature of each frame. The characteristic feature (or measure) could, if necessary, be quantized prior to being input into the hash algorithm. The use of (possibly quantized) measured characteristic features as input to the hash algorithm could improve its robustness, thereby improving its applicability for frame matching.

Alternatively or additionally, characteristic features of the frame or frames to be matched could be used by control unit 20 in step S60. Matching such characteristic features (signatures) may also be referred to as Content Based Copy Detection.

Such a characteristic feature of the frame or frames to be matched could be, for example, the co-ordinates of the centres of areas of uniform colour in the frame or frames to be matched which are above a minimum threshold size. The control unit 20 could operate to generate a list of such co-ordinates in a predefined order (for example a scanning order), thereby generating a signature of the frame or frames to be matched. This list of co-ordinates could then be compared with an equivalent list of co-ordinates for the frames of the full recording until a match is found.

Any suitable characteristic feature of the frame or frames to be matched could be used by control unit 20 in step S60. By way of further example, the Euclidean distance and/or vector direction between two features of data could be determined for the frame or frames to be matched and compared with the Euclidean distance and/or vector direction between the two features in the frames being matched (i.e. the frames of the full recording). Such features that could be used could be the co-ordinates of two areas of uniform colour above a threshold size.

Other content based copy detection that may be used in step S60 by control unit 20 can relate to a video sequence created from a series of frames at the start of the partial recording. This could involve, for example, tracking one or more features or objects in the frames from one frame to the next. An example of such a technique is a Block Matching Technique.

Any of the methods discussed herein for determining the position or positions in the full recording that correspond to the delayed start and/or premature end of the partial recording can be either threshold-based or best-match based. Threshold based means that, once a frame or frames is/are found in the full recording that match the frame or frames of the delayed start and/or premature end of the partial recording above a certain threshold, they are determined as being a correct match. This means that once a frame or frames in the full recording that match above the predetermined threshold, no more frames of the full recording are searched. If a best-match technique is used instead, then all of the frames of the full recording are searched in order to determine which frames best match the frame or frames at the delayed start and/or premature end of the partial recording.

Alternative methods that may be used in step S60 by control unit 20 include audio matching techniques. For example, an audio waveform of the frame or frames at the delayed start of the partial recording could be matched with the audio waveforms of the frames of the full recording.

Still alternatively, subtitled data could be used to match frames of the partial recording to those of the full recording, if available.

Using audio and/or subtitle data to match frames of the partial recording to those of the full recording could enhance the accuracy of the frame matching.

A timer could be used to locate the approximate position in the full recording that is equivalent to the delayed start point in the partial recording. The timer could be incorporated into the recording apparatus or broadcast signal storage apparatus. For example, this could be a simple timer that compares the length of the partial recording with that of the full recording. Knowing the approximate position would enable less data (for example, fewer frames) in the full recording to be searched for a match with the frame or frames at the delayed start of the partial recording. For example, only frames within a certain time of the approximate position could need to be searched. The range of the full recording (for example frames within five seconds, ten seconds, one minute or five minutes) could be searched for a match with the frame or frames at the delayed start point of the partial recording.

Still alternatively or additionally, meta-data could be used to determine the position in the full recording that is equivalent to the delayed start in the partial recording in step S60. For example, information from the Event Information Table could be used to determine the precise start time of the program that was partially recorded. This could be compared by control unit 20 with the exact start time of the recording (RSP in FIGS. 1A and 1C), as determined by, for example, the Time Offset Table and/or Time and Date Table. Subtracting the start time of the program from the Event Information Table from the actual start time of the recording from the Time Offset Table and/or Time and Date Table would then give the precise time of the program that was missed in the recording. This could then be used to locate the equivalent position in the full version that corresponds to the delayed start point (RSP) in the partial version.

Alternatively, information from only the Time Offset Table and/or Time and Date Table could be used to determine the precise length of the partial recording. This could be done by taking the exact time at the delayed start of the recording (i.e. at point RSP) away from the exact time at the end of the recording (point B in FIGS. 1A and 1C). Control unit 20 could then use this information to locate the equivalent position in the full recording that corresponds to the delayed start point in the partial recording.

Any other suitable meta-data that could be used to locate the precise time of the start of the partial recording relative to either the start of the program or the end of the recording could be used by control unit 20 in step S60.

Once the position in the full recording equivalent to the delayed start in the partial recording has been determined in step S60, the process moves to step S70.

In step S70, a marker is inserted into the full recording to show the position equivalent to the delayed start point in the partial recording. The markers can be any suitable indicators for identifying locations, such a positional markers, flags, chapter markers and so forth. The markers should be able to be identified by the user of recording apparatus 10. Furthermore, a user of recording apparatus 10 should be able to view the full recording from the marked position.

After the control unit has marked the equivalent position in the full recording in step S70, the process proceeds to step S80. In step S80, it is determined whether or not the recorded program has a premature end point. This can be determined in an analogous way (for example by using data from the Event Information Table, the Time Offset Table, and/or the Time and Date Table) to that of how it is determined in step S50 whether or not the partially recorded program has a delayed start point. Again, in some embodiments, the results of the steps performed in step S10 could be used in step S80.

If it is determined that the partially recorded program does have a premature end, then the process moves to step S90. In step S90, the position in the full recording equivalent to the premature end point in the partial recording is determined by control unit 120. Any one or more of the techniques discussed in relation to determining the equivalent position in the full recording of a delayed start point (see step S60) could be used in step S90.

Similarly, the marking of the equivalent position of a delayed start point as discussed above in relation to step S70 applies equally to the marking of an equivalent position of a premature end point in step S100.

In some embodiments, control unit 20 may insert the marker, or an additional marker, at a predetermined time before the located equivalent position in the full recording. This would enable a user of recording apparatus 10 to view from slightly before the delayed start point of the partial recording. This may be useful in giving a preview of the partial recording.

In the illustrated embodiment, once the equivalent positions of the delayed start point and/or premature end point of the partial recording have been marked in the full recording, the process proceeds to step S110. In step S110, the original, partial recording of the program is deleted.

Although the preferred embodiment has been described in relation to FIG. 3, it will be appreciated that the control unit 20 could be configured to perform the steps shown in FIG. 3 in a different order and still be in accordance with the present invention. For example, a control unit 20 could be arranged to determine whether or not the partially recorded program has a premature end directly after determining whether or not the partially recorded program has a delayed start. As such, S80 in FIG. 3 would be performed directly after S50. Similarly, the step of determining the position in the full recording equivalent to the premature end in the partial recording (step S90) could be performed by the control unit 20 directly after the determining of the position in the full recording equivalent to the delayed start position in the partial recording i.e. directly after step S60. Similarly, the marking of the position in the full recording corresponding to the premature end of the partial recording (step S100) could be performed directly after the marking of the position in the full recording corresponding to the delayed start of the partial recording i.e. directly after step S70.

In alternative embodiments, the deletion of the partially recorded program could be performed before the recording of the full version of the program. In these embodiments, information that is required from the partial recording to determine the positions in the full recording equivalent to the delayed start and/or premature end of the partial recording is extracted before the partial recording is deleted. For example, the control unit 20 could be configured to extract and store the first frame (or first few frames) and/or the last frame (or last few frames) of the partial recording before deleting the partial recording. The precise information extracted from the partial recording before deleting it is dependent on which of the techniques described herein is used for determining the position in the full recording which corresponds to the delayed start and/or premature end in the partial recording.

Indeed, any sequence of steps could be performed by control unit 20 so long as they result in the position or positions corresponding to the delayed start and/or premature end of the partial recording being input as markers into the full recording. It will thus be appreciated that the control unit 20 is not required to perform all of the steps shown in FIG. 3 in order to be in accordance with the present invention.

For example, it is not necessary for steps S10-S40 of FIG. 3 to involve the control unit 20. In some embodiments, these steps could be performed by an external device. In some embodiments, the only steps of FIG. 3 that need to involve (for example, be performed by) the recording device 10 are steps S50-S100. As such, the recording device 10 according to an embodiment of the invention can be arranged to perform no more steps than those required to determine if the partial recording has a delayed start and/or premature end; determine the position in the full recording which corresponds to the delayed start and/or premature end of the partial recording; and mark the corresponding positions in the full recording.

The invention claimed is:

1. A broadcast signal storage apparatus, comprising:
   a memory configured to store recordings of broadcast signals representing programs; and
   a control processor configured to control said broadcast signal storage apparatus, the control processor configured to, responsive to storage on said memory of both a first recording of a broadcast signal representing a partial version of a program, the partial version having one of a delayed start point and premature end point, and a second recording of a broadcast signal representing a full version of the same program,
   determine a position or positions in said second recording that correspond to the one of delayed start point and premature end point of said first recording using information from meta-data contained in said broadcast signal representing the partial version of the program and said broadcast signal representing the full version of the same program,
   store one or more markers indicating said position or positions in said second recording, and
   delete said first recording after said second recording has been recorded and after said one or more markers have been stored, wherein
   said broadcast signal storage apparatus is operable with signals according to a broadcast standard, and
   said meta-data includes data from one of a broadcast Event Information Table and a broadcast Time Table.

2. The broadcast signal storage apparatus according to claim 1, wherein
   the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and
   said frame matching technique matches a first frame of said first recording in the event that the first recording has a delayed start point, and a last frame of said first recording in the event that the first recording has a premature end point to corresponding frames of said second recording.

3. The broadcast signal storage apparatus according to claim 1, wherein
   the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and
   said frame matching technique involves using a plurality of frames from the start of said first recording in the event that the first recording has a delayed start point, and a plurality of frames from the end of said first recording in the event that the first recording has a premature end point to determine corresponding frames of said second recording.

4. The broadcast signal storage apparatus according to claim 3, wherein said frame matching technique includes comparing feature data in a sequence of frames at the start of said first recording in the event that the first recording has a delayed start point, and end of said first recording in the event that the first recording has a premature end point with feature data in a sequence of frames in said second recording.

5. The broadcast signal storage apparatus according to claim 3, wherein said frame matching technique involves block matching techniques.

6. The broadcast signal storage apparatus according to claim 1, wherein
   the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and
   said control processor is configured such that said frame matching technique involves performing a digital Fourier transform on a frame or frames of said first recording to be matched, performing the same digital Fourier transform to a frame or frames of said second recording, and comparing the two digital Fourier transforms.

7. The broadcast signal storage apparatus according to claim 1, wherein
   the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and said control processor is configured such that said frame matching technique involves applying a hash algorithm to a frame or frames at one of the start and end of said first recording, and comparing the resulting hash or hashes to the hash or hashes resulting from applying said hash algorithm to a frame or frames of said second recording.

8. The broadcast signal storage apparatus according to claim 1, wherein the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and said control processor is configured such that said frame matching technique involves matching one or more characteristic features of a frame or frames at the start of said first recording in the event that the first recording has a delayed start point, and one or more characteristic features of a frame or frames from the end of said first recording in the event that the first recording has a premature end point, with characteristic features of a frame or frames of said second recording.

9. The broadcast signal storage apparatus according to claim 1, wherein the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and said frame matching technique involves the use of Hough transforms.

10. The broadcast signal storage apparatus according to claim 1, wherein the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and said frame matching technique determines said position or positions in said second recording by identifying the closest matching frame or frames in said second recording to a frame or frames at the one of delayed start and premature end of said first recording.

11. The broadcast signal storage apparatus according to claim 1, wherein the control processor is configured to determine, using a frame matching technique, said position or positions in said second recording that correspond to the one of delayed start point and premature end point of said first recording, by comparing said first recording of said broadcast signal representing said partial version of said program, with said second recording of said broadcast signal representing said full version of said same program, and said frame matching technique determines said position or positions in said second recording by examining successive frames and identifying the first frame or frames in said second recording that match a frame or frames at the one of delayed start and premature end of said first recording above a certain threshold.

12. The broadcast signal storage apparatus according to claim 1, wherein said control processor is configured such that said position or positions in said second recording that correspond to the one of delayed start and premature end of said first recording are determined using audio-matching techniques.

13. The broadcast signal storage apparatus according to claim 1, further comprising:

a timer configured to identify a range or ranges in said second recording containing the position or positions in said second recording that correspond to said one of delayed start and premature end in said first recording, wherein said position or positions is or are determined by searching within the identified range.

14. The broadcast signal storage apparatus according to claim 1, wherein said control processor is further configured to recognize that said first recording represents a partially recorded version of a program; and said control processor is configured to cause recording of said second recording of the full version of the program in response to said recognition.

15. The broadcast signal storage apparatus according to claim 14, wherein said control processor is configured to determine said program to be recorded as said second recording by comparing an identifier of programs to be broadcast with a corresponding identifier of said first recording.

16. The broadcast signal storage apparatus according to claim 1, wherein said one or more markers is or are inserted into said second recording.

17. The broadcast signal storage apparatus according to claim 1, wherein said control processor is further configured to present, on a display, a graphical menu that allows selection of said second recording to be played back from at least one of the beginning of said second recording, and said position or positions indicated by said one or more markers.

18. The broadcast signal storage apparatus according to claim 1, wherein said control processor is further configured to present, on a display, a graphical menu that allows selection of said second recording to be played back from the beginning of said second recording, and said position or positions indicated by said one or more markers.

19. The broadcast signal storage apparatus according to claim 1, wherein the partial version includes both the delayed start point and premature end point, the delayed start point corresponding to a recording start point, and the premature end point corresponding to a recording end point.

20. The broadcast signal storage apparatus according to claim 1, wherein the partial version includes both the delayed start point and premature end point, the control processor is further configured to determine the positions in said second recording that correspond to both the delayed start point and premature end point of said first recording, and to store the markers indicating said positions in said second recording.

21. The broadcast signal storage apparatus according to claim 1, wherein the control processor is configured to store, in said second recording, at least one additional marker indicating a position that corresponds to a time before said position or positions, which correspond to the one of delayed start point and premature end point of said first recording.

22. The broadcast signal storage apparatus according to claim 1, wherein said control processor is further configured to allow access to both said partial version of said program and said full version of said same program from said second recording of said broadcast signal representing said full version.

23. The broadcast signal storage apparatus according to claim 1, wherein said control processor is further configured to automatically search at predetermined intervals in said memory for recordings of broadcast signals representing partial versions of programs.

24. A non-transitory computer readable storage medium encoded with computer program instructions which when executed by a processor of a broadcast signal storage apparatus causes the broadcast signal storage apparatus to display a graphical user interface to perform a method for use with the broadcast signal storage apparatus, the broadcast signal storage apparatus being operable with signals according to a broadcast standard, storing thereon a recording of a broadcast signal representing a full version of a program, determining a position or positions in said recording that correspond to one of a delayed start point and a premature end point of a previously recorded broadcast signal representing a partial version of the same program using information from meta-data contained in said broadcast signal and said previously recorded broadcast signal, and storing one or more markers indicating the position or positions in said recording that correspond to said one of said delayed start point and premature end point of said previously recorded broadcast signal representing said partial version of the same program, the method comprising:

allowing playback of said recording of the broadcast signal representing the full version of the program to be selected to start from at least one of the beginning of said recording, and the position or positions being indicated by said one or more markers and having been determined using said information from meta-data, said meta-data including data from one of a broadcast Event Information Table and a broadcast Time Table; and deleting said previously recorded broadcast signal representing the partial version of the same program after said broadcast signal representing the full version of the program has been recorded and after said one or more markers have been stored.

25. A method of operating a broadcast signal storage apparatus configured to manage recordings, the method comprising:

determining, by the broadcast signal storage apparatus, which is operable with signals according to a broadcast standard, a position or positions in a second recording that is a full version of a program that correspond to one of delayed start point and a premature end point in a first recording that is a partial version of the same program using information from meta-data contained in broadcast signal representing said partial version of said program and broadcast signal representing said full version of said same program, said meta-data including data from one of a broadcast Event Information Table and a broadcast Time Table, and said first recording that is said partial version of said program and said second recording that is said full version of said same program being stored in a memory;

storing, by the broadcast signal storage apparatus, one or more markers indicating said position or positions in said second recording; and deleting said first recording after storing said one or more markers in said second recording.

26. The method of operating a broadcast signal storage apparatus configured to manage recordings according to claim 25, wherein said determining includes using one of a frame matching technique, an audio technique, and meta data.

27. A non-transitory computer readable storage medium encoded with computer program instructions which when executed by a processor of a broadcast signal storage apparatus configured to manage recordings, causes the broadcast signal storage apparatus to perform a method according to claim 25.

* * * * *